(12) United States Patent
Williams et al.

(10) Patent No.: US 9,577,954 B2
(45) Date of Patent: Feb. 21, 2017

(54) TIME DOMAIN DUPLEX (TDD) SWITCHING SYSTEM

(75) Inventors: Thomas H. Williams, Longmont, CO (US); Luis Alberto Campos, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1273 days.

(21) Appl. No.: 13/537,430

(22) Filed: Jun. 29, 2012

(65) Prior Publication Data

US 2014/0003307 A1    Jan. 2, 2014

(51) Int. Cl.
| | | |
|---|---|---|
| H04L 12/933 | (2013.01) | |
| H04L 5/14 | (2006.01) | |
| H04N 21/61 | (2011.01) | |
| H04N 21/24 | (2011.01) | |
| H04W 72/04 | (2009.01) | |

(52) U.S. Cl.
CPC ............... H04L 49/10 (2013.01); H04L 5/14 (2013.01); H04W 72/0406 (2013.01); H04N 21/2408 (2013.01); H04N 21/61 (2013.01)

(58) Field of Classification Search
None
See application file for complete search history.

(56) References Cited

U.S. PATENT DOCUMENTS

| | | | | |
|---|---|---|---|---|
| 2003/0104780 A1* | 6/2003 | Young | .................. | H04B 1/0096 455/7 |
| 2008/0151790 A1* | 6/2008 | Lee | .................... | H04L 12/2892 370/282 |
| 2010/0223651 A1* | 9/2010 | Wang | .................. | H04L 12/2801 725/125 |
| 2010/0265839 A1* | 10/2010 | Almgren | ............ | H04B 7/15535 370/252 |
| 2011/0053637 A1* | 3/2011 | Filipovic | .................. | H04B 1/38 455/552.1 |
| 2011/0158081 A1* | 6/2011 | Wang | ...................... | H03F 1/304 370/201 |
| 2011/0185394 A1* | 7/2011 | Rakib | .................... | H04J 3/0682 725/111 |
| 2013/0109433 A1* | 5/2013 | Wang | ..................... | H04B 1/525 455/552.1 |
| 2013/0114480 A1* | 5/2013 | Chapman | .............. | H04L 5/1469 370/282 |
| 2013/0136038 A1* | 5/2013 | Spagnolini | ........ | H04W 72/0406 370/280 |
| 2013/0208632 A1* | 8/2013 | Williams | .................. | H04L 5/14 370/279 |

(Continued)

*Primary Examiner* — Ayaz Sheikh
*Assistant Examiner* — Mariela Vidal Carpio
(74) *Attorney, Agent, or Firm* — Great Lakes Intellectual Property, PLLC.

(57) ABSTRACT

Time domain duplex (TDD) is contemplated, including controlling switches and/or amplifiers to facilitate signaling between a network and a plurality of end stations (ESs) according to a TDD control strategy. The TDD control strategy may be characterized by preventing simultaneous upstream and downstream communication between the network and one or more of the ESs over a particular frequency band. The TDD control strategy may be limited to a particular frequency range such that signaling outside of frequency range may be simultaneously communicated upstream and downstream.

17 Claims, 3 Drawing Sheets

(56) References Cited

U.S. PATENT DOCUMENTS

| | | | | |
|---|---|---|---|---|
| 2013/0279914 A1* | 10/2013 | Brooks | .............. | H04Q 11/0067 |
| | | | | 398/66 |
| 2013/0315595 A1* | 11/2013 | Barr | ........................ | H04J 14/08 |
| | | | | 398/67 |
| 2013/0322882 A1* | 12/2013 | Fang | ..................... | H04J 3/1694 |
| | | | | 398/67 |
| 2013/0343759 A1* | 12/2013 | Pietsch | ................. | H04J 3/1694 |
| | | | | 398/75 |
| 2014/0321258 A1* | 10/2014 | Varanese | ............... | H04J 3/1694 |
| | | | | 370/203 |

\* cited by examiner

TIME DOMAIN DUPLEX (TDD) SWITCHING SYSTEM

TECHNICAL FIELD

The present invention relates to time domain duplex (TDD) network, such as but not necessarily limited to controlling a switching system according to a TDD control strategy.

BACKGROUND

Frequency domain duplex (FDD) relates to a signaling configuration where a transmitter and a receiver operate at different frequencies for a particular session (the FDD transmitter and receiver pair may simultaneously operate at multiple frequencies for different sessions). The different frequencies allow simultaneous upstream and downstream signaling to take place between the transmitter and the receiver. Time domain duplex (TDD) systems relate to a signaling configuration where the transmitter and a receiver operate at the same frequency for a particular session (the TDD transmitter and receiver pair may simultaneously operate at other frequencies for different sessions). The TDD type of signaling may be preferred over the FDD since it allows a maximum available bandwidth used for the direction needed at any instant in time.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
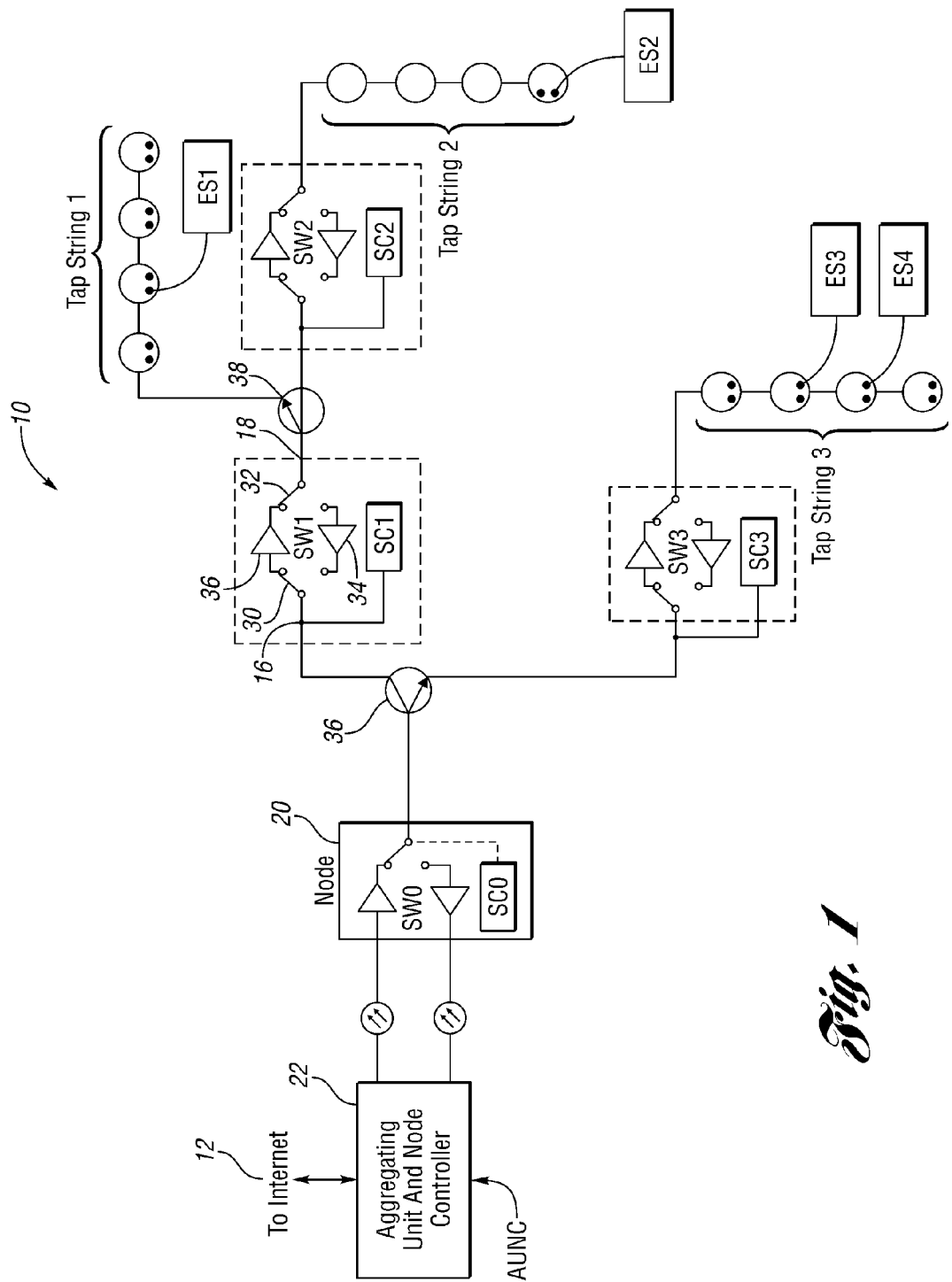
FIG. 1 illustrates a time domain duplex (TDD) system as contemplated by one non-limiting aspect of the present invention.

FIG. 1 illustrates a time domain duplex (TDD) system 10 as contemplated by one non-limiting aspect of the present invention. The system 10 is predominately described with respect to facilitating signaling over a cable infrastructure between a network, such as but not necessarily limited to the Internet 12, and a plurality of end stations (ESs) ES1, ES2, ES3, ES4. The system 10 may include a plurality of switches SW0, SW1, SW2, SW3 having amplifiers and controllers SC1, SC2, SC3 to facilitate the contemplated signaling, including those described within U.S. patent application Ser. No. 13/372,906, the disclosure of which is hereby incorporated by reference in its entirety. Each switch SW0, SW1, SW2, SW3 may include an upstream interface 16 and a downstream interface 18 (only labeled for SW1) through which signals are exchanged with the corresponding communication medium (the upstream interface 16 corresponds with a left-hand side and the downstream interface 18 corresponds with a right hand side). The switches SW0, SW1, SW2, SW3 and the ESs ES1, ES2, ES3, ES4 may be controlled according to a TDD control strategy to reverse the direction of signal flow on the network as needed.

The cable infrastructure may include various portions comprised of optical fibers and/or coaxial cables. Optionally, a node 20 may be included to facilitate translating signaling sufficient for transmission over optical fibers to signaling sufficient for transmission over coaxial cables. The cable environment is particularly contemplated since the TDD control strategy may be beneficial in allowing higher frequency communications between the Internet 12 and the ESs ES1, ES2, ES3, ES4, which due to the higher frequencies, may require the use of amplifiers to allow a corresponding signal to travel over greater distances, and switches SW0, SW1, SW2, SW3 to prevent or ameliorate interference ingresses, i.e., one or more of the switches SW0, SW1, SW2, SW3 may be controllably closed to prevent interference from a corresponding portion of the system 10, and oscillation in the case of amplifiers. While predominately described with respect to this cable infrastructure, the present invention is not necessarily so limited and fully contemplates its use and application in other environments where TDD may be desired. In particular, the present invention contemplates its use with star networks as well as tree-and-branch networks. For example, the present invention could configured for use with any coaxial line that has too much attenuation and requires amplifiers to boost the signals and/or with systems that have an air interface that is wireless systems.

The system 10 may include a controller 22 to facilitate the contemplated TDD signaling. The controller 22 may be a unit having capabilities to facilitate interfacing signaling between the Internet 12 and the ESs ES1, ES2, ES3, ES4 as well as issuing commands, MAC (media access control) messages, or other signaling sufficient to control the node 20, switches SW0, SW1, SW2, SW3, and ESs ES1, ES2, ES3, ES4 according to the requirements of the TDD network. These capabilities may be combined into the illustrated aggregating unit and node controller (AUNC) 22 and/or provided through other standalone controllers (not shown). The AUNC 22 is shown to facilitate interfacing signaling with the Internet 12 for exemplary and non-limiting purposes as the AUNC 22 may be configured to facilitate interfacing signaling with other types of networks, such as a private network, an inside network or a home network. The AUNC 22 may be configured to conduct polling and/or ranging operations to assess the operating conditions, states and desires of the node 20, switches SW0, SW1, SW2, SW3, and ESs ES1, ES2, ES3, ES4. This may include assessing whether the ESs ES1, ES2, ES3, ES4 desire signaling with the Internet 12, such as by querying a queue for each ESs ES1, ES2, ES3, ES4, and if so, and controlling the node 20 and switches SW0, SW1, SW2, SW3 to facilitate the desired signaling.

The AUNC 22 may be configured to issue a switch control to a switch controller associated with each of the node 20 and switches SW0, SW1, SW2, SW3 (e.g., SC0, SC1, SC2, SC3). The switch control may be used to control one or more gates 30, 32 to direct signaling to one of an upstream amplifier 34 and a downstream amplifier 36 (shown only with respect to SW1) according to whether upstream or downstream signaling is desired. Optionally, the switches SW0, SW1, SW2, SW3 may default to the downstream position (illustrated) such that the upstream position is switched to for a fixed period of time. One or more combiners 36, 38 may be included within different portions of the system to facilitate connecting each tap string (e.g., tap string 1, tap string 2, tap string 3) to a main line. Each string tap string 1, tap string 2, tap string 3 may include a plurality of taps to facilitate connection with the ESs ES1, ES2, ES3, ES4. The design of the network depends on a length of the signaling path between the AUNC 20 and each of the ESs ES1, ES2, ES3, ES4, the number of ESs ES1, ES2, ES3, ES4, and right-of-way for cable lines. The number and use of the amplifiers 36, 38 may similarly be influenced by the path between the AUNC 22 and the ESs ES1, ES2, ES3, ES4, particularly whether those paths are susceptible to high attenuation, signal loss, or other influences that may require amplification in order to improve their communication capabilities. For example, 30 amplifying switches may be required in the event the node supports 500 ESs in a low density neighborhood. In a high density neighborhood, less amplifiers would be required because of shorter line lengths. (Since switches may be used to keep the amplifiers from oscillating, their use may be eliminated by replacing the amplifier with a wire.)

The ESs ES1, ES2, ES3, ES4 may correspond with routers, cable modems, access points or other interfaces through which a user interacts to facilitate signaling with the Internet 12 or other ones of the ESs ES1, ES2, ES3, ES4. The ESs ES1, ES2, ES3, ES3 may be configured to support a home network or other local network such that it acts as a gateway or other type of network address translator between the Internet 12 and its local network. The ESs ES1, ES2, ES3, ES4 may be a computer, a tablet, a media terminal adapter, a personal digital assistant (PDA), a set top box (STB) or other device through which TDD signaling dependent services may be accessed. The services which may be accessed through the ESs may correspond with television related services associated with a cable television provider, data services associated with a high-speed data provider or Internet service provider, services of a cellular phone or voice over IP (VoIP) provider, services of a broadcast or satellite television service provider, or other signaling dependent services associated with a multiple system operator (MSO).

Accordingly, one non-limiting aspect of the present invention contemplates a TDD switching system 10 using the AUNC 22 for controlling both ESs transmissions and switch direction. The TDD system 10 may be used for allowing coaxial systems to provide high speed bi-directional data between a controlling AUNC 22 and a plurality of ESs ES1, ES2, ES3, ES4. One benefit of this architecture may include providing high-speed IP service to a service group of ESs ES1, ES2, ES3, ES4 in a node 20 while limiting upstream noise funneling and ingressing signal sources, such as but not necessarily limited to the noise associated with broadcast and cell phone traffic.

The AUNC 22 may be configured to control when each of the ESs (ES1, ES2, ES3) transmits data and receives data by controlling the direction of each direction control switch SW0, SW1, SW2, SW3 and by sending and receiving data to/from ESs ES1, ES2, ES3, ES4. In practice each direction control switch SW0, SW1, SW2, SW3 may be configured to rest in the downstream direction, and revert to the upstream direction when it receives a command from the AUNC 22, addressed to only its switch control, that states when and for how long the switch SW0, SW1, SW2, SW3 should switch into the upstream direction. The command to change directions may be delivered over the downstream signal path and coordinated with downstream transmissions to individual ESs ES1, ES2, ES3, ES4 instructing receiving ESs when to transmit, and for how long. Thus each ESs ES1, ES2, ES3, ES4 may be configured to listen for an opportunity to transmit, and when it transmits all switches SW0, SW1, SW2, SW3 in its path to the AUNC 22 may be required to change direction to accommodate the upstream transmission, i.e., to transition from the downstream position to the upstream position. At the end of the transmission period, the transmitting one of the ESs ES1, ES2, ES3, ES4 may stop transmitting and the addressed switches SW0, SW1, SW2, SW3 may time-out and revert to the downstream direction.

In a learning process, the AUNC 22 may be configured to learn which switches SW0, SW1, SW2, SW3 are in the path of each ES ES1, ES2, ES3, ES4. This may be done by making all switches SW0, SW1, SW2, SW3 go upstream while a subject ES ES1, ES2, ES3, ES4 is transmitting (e.g. a ping) and then opening the switches SW0, SW1, SW2, SW3 one at a time until the ping is not received. Thus, a missed ping indicates that a switch SW0, SW1, SW2, SW3 is controlling upstream transmission from a particular ES ES1, ES2, ES3, ES4. This information may be stored by the AUNC 22 for each ES ES1, ES2, ES3, ES4. Optionally, each ESs ES1, ES2, ES3, ES4 may be configured to maintain a master clock, controlled by the AUNC 22, over the downstream path. In another learning process, the AUNC 22 may be configured to learn whether new ESs ES1, ES2, ES3, ES4 that have just entered the system. In this process, all upstream paths may be enabled and all new CMs (ESs) ES1, ES2, ES3, ES4 that haven't been told to not transmit will transmit in contention mode, i.e., in a manner that allows the AUNC 22 to identify the new ones of the DSS for the purposes of integrating them into the TDD control contemplated by the present invention.

Figure 2:
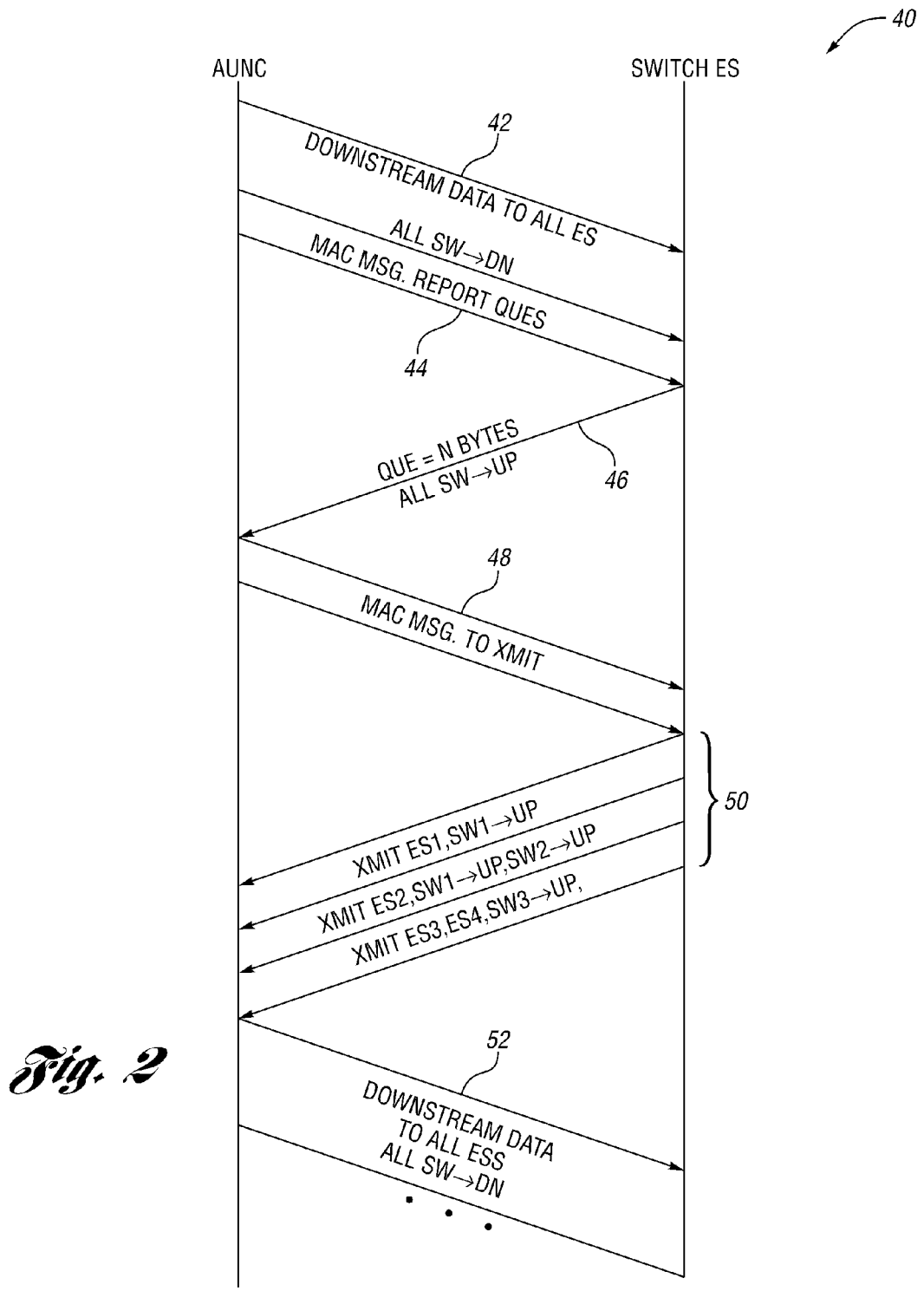
FIG. 2 illustrates a flow diagram of a method for TDD signaling signals as contemplated by one non-limiting aspect of the present invention.

FIG. 2 illustrates a flow diagram 40 of a method for TDD signaling signals as contemplated by one non-limiting aspect of the present invention. The AUNC 22, switches SW0, SW1, SW2, SW3, the ESs ES1, ES2, ES3, ES4 or other suitable devices associated with the system 10 may be configured to facilitate implementing the control and processes contemplated by the TDD method. For the sake of example, the AUNC 22 is predominately described as being responsible for issuing commands or other instructions associated with directing or otherwise facilitating the operations and processes contemplated herein. To this end, the AUNC 22 may include a non-transitory computer-readable medium having computer-readable code embodied therein for controlling a computing device (e.g., AUNC) to electronically facilitate the contemplated TDD. The present invention, however, is not so limited and contemplates other devices be configured to achieve similar results.

A first operation 42 may include the AUNC 22 issuing commands sufficient to enable downstream data to be sent to all ESs ES1, ES2, ES3, ES4 or a selectable number of ESs ES1, ES2, ES3, ES4 within its control domain (depending on network configurations and branching, some ESs ES1, ES2, ES3, ES4 may be isolated from paths of the to be controlled ESs ES1, ES2, ES3, ES4 such that the corresponding switches SW0, SW1, SW2, SW3 may be ignored, i.e., some data may be ignored but not commands about when to change the switches to upstream). This may include an operation where the relevant switches SW0, SW1, SW2, SW3 are control to the downstream position or at least the switches SW0, SW1, SW2, SW3 through which signals must travel in order to connect the AUNC 22 with the desired ESs ES1, ES2, ES3, ES4. Once in the downstream position, the AUNC 22 or other upstream devices, are able to communicate signals downstream to the ESs ES1, ES2, ES3, ES4. Optionally, the AUNC 22 may be configured to control the frequencies and timing at which these signals are transmitted, e.g., multiple frequencies may be used in the event it is desirable to simultaneously communicate downstream with multiple ESs ES1, ES2, ES3, ES4.

A next operation 44 may include requesting each ESs ES1, ES2, ES3, ES4 to report their queues and instructing the switches SW0, SW1, SW2, SW3 to upstream position so that the corresponding responses may be received at a following operation. This may include polling 46 a byte queue of the ESs ES1, ES2, ES3, ES4 to determine amount of data that each ESs ES1, ES2, ES3, ES4 desires to transmit. In another operation a MAP message may be sent telling each ES when and for how long to transmit via a time-slot or transmission slot grant system. U.S. patent application Ser. No. 12/954,079, the disclosure of which is hereby incorporated by reference in its entirety, relates to one type of MAP based scheduling system suitable for use with the present invention. A similar supporting message 48 will be sent to each switch telling it for how long and when to switch to the upstream direction.

After all scheduled upstream transmissions 50 have occurred, the downstream data is again sent 52 to all ESs ES1, ES2, ES3, ES4. Thus, the downstream and upstream data in this embodiment is bursty, i.e., a direction switch change will break a continuous downstream transmission.

One benefit of the present invention is that the AUNC 22 can adapt to the interference present on the network. Thus, if interference is received, the bad branch can be isolated. The bad branch with interference can be serviced separately on a best-effort basis, without creating interference to the good branches. When a bad branch is discovered, a trouble ticket can be generated describing the branch, the time of day, and a spectral plot of this interference. This may speed time and effort to repair. Thus the avoidance of the interference may be a feature of the MAC system, while the generation (and resolution) of a trouble ticket will be part of an OSS (operational support system).

Figure 3:
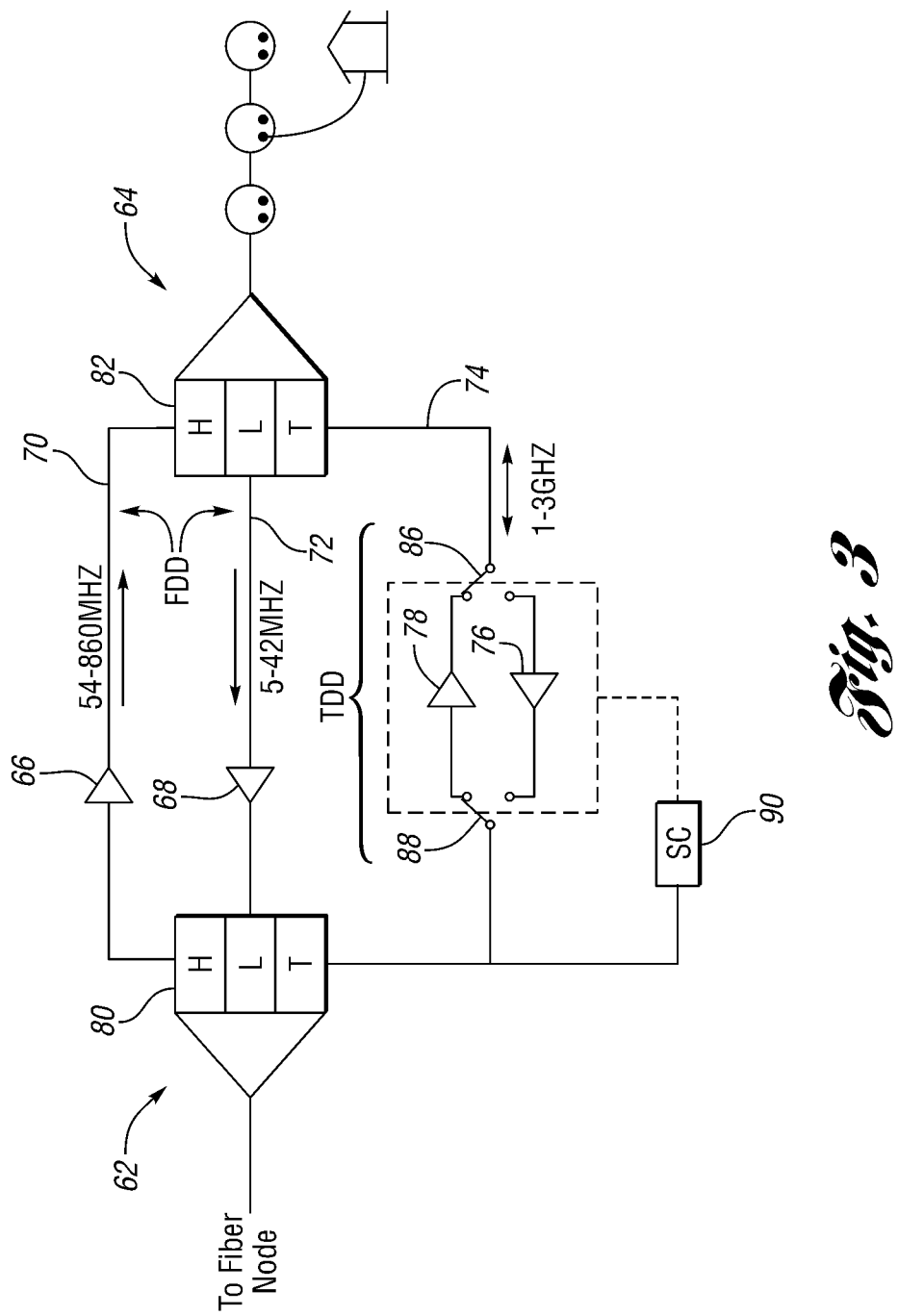
FIG. 3 illustrates a triplexer as contemplated by one non-limiting aspect of the present invention.

If this invention is deployed over a system with a continuously-on portion of the band, the switch control signals can be carried over the continuously-on portion. Transmissions from ESs can be multiple access, such a OFDMA, SC-FDMA. Likewise ESs can transmit at the same time in different frequency bands. One advantage of the present invention is that the switch control signals travel over the downstream direction, which is clean. If the gate control signals travel over the upstream, they may be contaminated with ingressing noise, causing false triggers, and/or slower detection. This invention can also be used for fiber optic cable as well as coaxial cable. While ingressing noise is not expected be a common impairment on fiber optic cable, using switches instead of splitters/combiners can allow networks, such as EPON (Ethernet passive optical network) to support a much greater number of ESs. This is because splitting/combining losses are larger in passive optical networks than fiber optic cable loss, and switches have less insertion loss than splitters FIG. 3 illustrates a triplexer 60 as contemplated by one non-limiting aspect of the present invention. The triplexer 60 may be used in place of one or more of the switches SW0, SW1, SW2, SW3 described above with respect to FIG. 1. The triplexer 60 is shown in order to particularly illustrate additional bidirectional signaling between the AUNC 22 and ESs ES1, ES2, ES3, ES4. (While predominately commonly described with respect to one-dimensional, TDD communication in either one of the upstream or downstream direction between the AUNC and a corresponding one or more of the ESs, the system associated with FIG. 1 may include bypasses or other communication mediums to allow out of band (OOB) or other bidirectional communication, i.e., signaling other than that which is desired for TDD, between the AUNC 22 and the ESs ES1, ES2, ES3, ES4.)

The triplexer 60 may include an upstream interface 62 and a downstream interface 64 to facilitate interfacing signals in either one of the upstream and downstream directions. The triplexer 60 or may further include a downstream amplifier 66 operable to amplify downstream signaling between the upstream and downstream interfaces 62, 64 and an upstream amplifier 68 operable to amplify upstream signaling between the downstream and upstream interfaces 62, 64. The upstream and downstream amplifiers 66, 68 may be respectively associated with a high signal path 70 and a low signal path 72. The high and low signal paths 70, 72 may be respectively associated with 54-860 MHz and 5-42 MHz FDD signaling. The signaling may be in contrast to 1-3 GHz, TDD signaling carried through a top-split signaling path 74 where corresponding upstream and downstream amplifiers 76, 78 are similarly used to amplify signal transmissions.

A multi-band filter 80, 82 may be included at one or both of the upstream and downstream interfaces 62, 64 to facilitate separating signaling according to its associated frequency i.e., splitting signals to one of the upstream signal path 72, the downstream signal path 70, or the TDD signal path 74. This type of configuration may be useful in a system where multiple frequencies are carried between the AUNC 22 and one or more of the ESs ES1, ES2, ES3, ES4, such as in a cable infrastructure where some of the devices are unable to support TDD or the higher frequencies associated with TDD or in systems where there may be some benefit to having some communications carried over FDD. The triplexer 60 may include gates 86, 88 operably connected relative to the downstream and upstream interfaces 62, 64 and the first and second amplifiers 76, 78 of the TDD path 74 to direct signaling through a selected one of the first amplifier 76 and the second amplifier 78. A switch controller 90 may be included to facilitate actuation of the gates 86, 88 according to signals received from the AUNC 22. Control for the SC 90 can alternately be carried over the 54-860 MHz downstream interface.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A time domain duplex (TDD) system configured to facilitate signaling between a network and a plurality of end stations (ESs), the system comprising:
  a plurality of switches connected between the network and the ESs, the switches being operable between an upstream position and a downstream position, the upstream position allowing upstream signaling from one or more ESs of the plurality of ESs to the network, the downstream position allowing downstream signaling from the network to the one or more ESs; and
  a controller configured to facilitate:
    compliance of the ESs and the switches with a TDD schedule, the TDD schedule specifying: (a) upstream transmission slots during which the ESs are authorized to transmit signaling to the network, (b) downstream position slots during which the switches are to be in the downstream position, and (c) upstream position slots during which the switches are to be in the upstream position; and a learning process for identifying each one or more of the switches defining each of a plurality of paths communicatively connecting a corresponding one of the ESs with the network;

wherein the learning process includes the controller:
i) instructing a first ES of the ESs to repeatedly transmit a test signal to the network throughout a first period of time;
ii) during the first period:
  (1) instructing each of the ESs other than the first ES not to transmit the test signal;
  (2) iteratively controlling one or more of the switches to the downstream position and the remaining one or more of the switches to the upstream position at a plurality of intervals such that each interval corresponds with a different one or more of the switches being controlled to the downstream position; and
iii) determining each of the switches within a first path of the plurality of paths corresponding with the first ES depending on whether the test signal reaches or fails to reach the network during a corresponding one of the intervals.

2. The TDD system of claim 1 wherein the TDD schedule specifies the upstream transmission, downstream position slots, and upstream position slots such that simultaneous upstream and downstream signaling through the switches is prohibited.

3. The TDD system of claim 2 wherein simultaneous upstream and downstream signaling only in the range of 1-3 GHz is prohibited.

4. The TDD system of claim 1 wherein the switches include:
an upstream interface;
a downstream interface;
a first amplifier operable to amplify downstream signaling between the upstream interface and the downstream interface;
a second amplifier operable to amplify upstream signaling between the downstream interface and the upstream interface;
a gate operably connected between the upstream interface and the downstream interface to selectably direct signaling through a selected one of the first amplifier and the second amplifier, the first amplifier being selected during the downstream position slot and the second amplifier being selected during the upstream position slot.

5. The TDD system of claim 1 further comprising an aggregating unit downstream of the network and upstream of the switches configured to interface signals between the network and the ESs.

6. The TDD system of claim 5 wherein the network is the Internet.

7. The TDD system of claim 1 wherein one or more of the switches include a multiband filter configured to provide a high signal path, a low signal path, and a top-split signal path between an upstream interface and a downstream interface, wherein the top-split signal paths include:
a first amplifier operable to amplify downstream signaling between the upstream interface and the downstream interface;
a second amplifier operable to amplify upstream signaling between the downstream interface and the upstream interface;
a gate operably connected between the upstream interface and the downstream interface to selectably direct signaling through a selected one of the first amplifier and the second amplifier, the first amplifier being selected during the downstream slot and the second amplifier being selected during the upstream slot.

8. The TDD system of claim 7 wherein the multiband filter configured to direct signaling between 54-860 MHz through the high signal path, signaling between 5-42 MHz through the low signal path, and bi-directional signaling between 1-3 GHz through the top-split signal path.

9. A method of facilitating time domain duplex (TDD) based signaling between a network and a plurality of end stations (ESs), wherein the signaling is facilitated with a plurality of switch-based amplifiers, the switch-based amplifiers each at least including (a) an upstream interface, (b) a downstream interface, (c) a first amplifier operable to amplify downstream signaling from the upstream to the downstream interfaces, (d) a second amplifier operable to amplify upstream signaling from the downstream to the upstream interfaces, and (e) a gate operably connected between the downstream interface and the upstream interface to selectably direct the TDD signaling through a selected one of the first amplifier and the second amplifier, the method comprising:
scheduling upstream transmission slots during which the ESs are authorized to transmit the upstream signaling;
scheduling downstream position slots during which the gates are to direct the downstream signaling through the first amplifier;
scheduling upstream position slots during which the gates are to direct the upstream signaling through the second amplifier;
scheduling the upstream transmission slots, downstream position slots, and upstream position slots to provide TDD signaling control, the TDD signaling control preventing simultaneous upstream and downstream signaling between the network and the ESs; and
determining a first one or more switch-based amplifiers of the plurality of switched-based amplifiers within a signaling path of a first ES of the plurality of ESs as a function of a learning process, the learning process including:
i) instructing the first ES to repeatedly transmit a test signal to the network throughout a first period of time;
ii) during the first period:
  (1) instructing each of the ESs other than the first ES not to transmit the test signal;
  (2) iteratively controlling one or more of the switch-based amplifiers to the downstream position and the remaining one or more of the switch-based amplifiers to the upstream position at a plurality of intervals such that each interval corresponds with a different one or more of the switch-based amplifiers being controlled to the downstream position; and
iii) determining each of the switch-based amplifiers within the signaling path depending on whether the test signal reaches or fails to reach the network during a corresponding one of the intervals.

10. The method of claim 9 further comprising scheduling the upstream transmission slots, downstream position slots, and upstream position slots such that simultaneous upstream and downstream signaling is prevented for 1-3 GHz signaling and permitted for signaling outside of 1-3 GHz.

11. The method of claim 9 further comprising polling a byte queue of one or more of the ESs and scheduling at least one of a length and a start of the transmission slots of the polled ESs based on an amount of data within the corresponding byte queue.

12. The method of claim 9 further comprising notifying the plurality of switch-based amplifiers and ESs of the scheduled upstream transmission slots, downstream position slots, and upstream position slots with instructions communicated from a controller located upstream from each of the switches.

13. The method of claim 9 further comprising scheduling transmission slots for at least the first ES and a second ES of the plurality of ESs to occur at the same time.

14. The method of claim 9 further comprising selecting the first ES from the plurality of ESs as a function of a contention process, the contention process identifying newly connected ESs by instructing each of the plurality of ESs previously connected to cease transmission.

15. A non-transitory computer-readable medium having computer-readable code embodied therein for controlling a computing device to electronically facilitate time domain duplex (TDD) signaling, the computer-readable code comprising instructions sufficient for:

scheduling upstream transmission slots during which end stations (ESs) are authorized to transmit upstream signaling to a network;

scheduling downstream position slots during which switches connected between the network and the ESs are to be in a downstream position;

scheduling upstream position slots during which the switches connected between the network and the ESs are to be in an upstream position; and commanding the switches connected between the network and the ESs to toggle between the upstream and the downstream positions for at least the TDD signaling within a first frequency range, the upstream position permitting the upstream signaling and preventing downstream signaling, the downstream position permitting the downstream signaling and preventing the upstream signaling, the switches being configured to amplify the upstream and the downstream signaling within the first frequency range;

segregating a first ES of the ESs from a second ES of the ESs attempting the upstream signaling when the first ES is producing excessive ingress interference;

toggling a second one or more of the switches to the upstream positions while toggling at least a first one or more of the switches to the downstream positions;

implementing a learning process for identifying one or more of the switches within a signaling path of the first ES of the ESs with the network, the learning process including:

i) instructing the first ES to repeatedly transmit a test signal to the network throughout a first period of time;

ii) during the first period;

(1) instructing each of the ESs other than the first ES not to transmit the test signal;

(2) iteratively controlling one or more of the switches to the downstream position and the remaining one or more of the switches to the upstream position at a plurality of intervals such that each interval corresponds with a different one or more of the switches being controlled to the downstream position; and iii) determining each of the switches within the signaling path depending on whether the test signal reaches or fails to reach the network during a corresponding one of the intervals.

16. The computer-readable code of claim 15 further comprising instructions sufficient for commanding the plurality of ESs when to transmit signaling occurring within at least a second frequency range during one or more transmission slots, the second frequency range being outside the first frequency range, including commanding at least one of the plurality of ESs to transmit upstream signaling within the second frequency range while a first switch upstream thereof is commanded to the downstream position.

17. The computer-readable code of claim 15 further comprising instructions sufficient for commanding the plurality of ESs to facilitate the TDD signaling when transmitting signaling within 1-3 GHz and for commanding the plurality of ESs to facilitate frequency domain duplex (FDD) signaling when transmitting signaling outside of 1-3 GHz.

* * * * *